(12) United States Patent
Inami

(10) Patent No.: US 8,448,187 B2
(45) Date of Patent: May 21, 2013

(54) CONFLICT RESOLUTION APPARATUS

(75) Inventor: Satoshi Inami, Osaka (JP)

(73) Assignee: Panasonic Corporation, Osaka (JP)

( * ) Notice: Subject to any disclaimer, the term of this patent is extended or adjusted under 35 U.S.C. 154(b) by 1292 days.

(21) Appl. No.: 11/996,535

(22) PCT Filed: May 18, 2006

(86) PCT No.: PCT/JP2006/309913
§ 371 (c)(1),
(2), (4) Date: Jan. 23, 2008

(87) PCT Pub. No.: WO2007/020735
PCT Pub. Date: Feb. 22, 2007

(65) Prior Publication Data
US 2009/0144756 A1    Jun. 4, 2009

(30) Foreign Application Priority Data

Aug. 18, 2005   (JP) ................................. 2005-237153

(51) Int. Cl.
*G06F 3/00* (2006.01)
(52) U.S. Cl.
USPC ......................................................... 719/318
(58) Field of Classification Search
None
See application file for complete search history.

(56) References Cited

U.S. PATENT DOCUMENTS

| | | | | |
|---|---|---|---|---|
| 5,862,385 A | * | 1/1999 | Iitsuka | ........................... 717/156 |
| 2003/0110202 A1 | | 6/2003 | Shitahaku | |
| 2004/0023646 A1 | | 2/2004 | Inami et al. | |
| 2004/0098526 A1 | | 5/2004 | Matsumoto et al. | |
| 2005/0223352 A1 | | 10/2005 | Nishida | |

FOREIGN PATENT DOCUMENTS

| | | |
|---|---|---|
| CN | 1 426 264 | 6/2003 |
| CN | 1 501 255 | 6/2004 |
| EP | 1 422 622 | 5/2004 |
| JP | 2003-177926 | 6/2003 |
| JP | 2004-078936 | 3/2004 |
| JP | 2004-178578 | 6/2004 |
| JP | 2005-004350 | 1/2005 |
| JP | 2005-284905 | 10/2005 |
| WO | 2004/111847 | 12/2004 |

OTHER PUBLICATIONS

International Search Report mailed Aug. 8, 2006 for International Application No. PCT/JP2006/309913.

\* cited by examiner

*Primary Examiner* — H S Sough
*Assistant Examiner* — Carina Yun
(74) *Attorney, Agent, or Firm* — Wenderoth, Lind & Ponack, L.L.P.

(57) ABSTRACT

A conflict resolution apparatus automatically updates an application conflict rule specifying a conflict condition among applications when a device is installed or uninstalled. An application conflict rule storage section stores the application conflict rule. An application executing section determines, based on the application conflict rule, conflicts among a plurality of applications and executes at least one application in accordance with a result of the determination. An application conflict rule updating section updates the application conflict rule in accordance with a change of the conflict condition among the plurality of applications when a resource of the conflict resolution apparatus is changed.

9 Claims, 9 Drawing Sheets

FIG. 3

APPLICATION CONFLICT RULE — 15

| APPLICATION B \ APPLICATION A | BROWSER | PHONE APPLICATION | MELODY PLAYER |
|---|---|---|---|
| BROWSER | ○ (NOT CONFLICTING) | △ (SUSPENDED) | ○ |
| PHONE APPLICATION | × (CONFLICTING) | × | ○ |
| MELODY PLAYER | × | × | × |

FIG. 4

APPLICATION CONFLICT RULE — 15

| APPLICATION B | | TV APPLICATION | | | | BROWSER | | |
|---|---|---|---|---|---|---|---|---|
| | | STATE 1 | STATE 2 | ・・ STATE 3 | ・・ | STATE 1 | STATE 2 | STATE 3 |
| : | ・・ | ・・ | ・・ | ・・  ・・ | ・・ | ・・ | ・・ | ・・ |
| PHONE APPLICATION | STATE 1 | ○ | ○ | ・・ △ | ・・ | ○ | ○ | ○ |
| | STATE 2 | × | × | ・・ | ・・ | ○ | ○ | ○ |
| | : | : | : | ・・ : | ・・ | ○ | : | ○ |
| | STATE 3 | ○ | ○ | ・・ × | ・・ | ○ | ○ | ○ |
| : | ・・ | ・・ | ・・ | ・・ ・・ | ・・ | ・・ | ・・ | ・・ |
| BROWSER | STATE 1 | ○ | ○ | ・・ | ・・ | ○ | ○ | △ |
| | STATE 2 | ○ | × | ・・ | ・・ | ○ | | △ |
| | STATE 3 | × | | ・・ | ・・ | | | |

| DEVICE-RESOURCE INFORMATION | | |
|---|---|---|
| DEVICE NAME | DEVICE ID | RESOURCE TYPE |
| DEVICE A | 4383583 | SOUND DEVICE TYPE A |
| DEVICE B | 4383584 | SOUND DEVICE TYPE B |
| DEVICE C | sd3893DA | MEMORY DEVICE |

| RESOURCE REQUIRING INFORMATION | |
|---|---|
| RESOURCE TYPE | REQUIRED INFORMATION |
| MEMORY DEVICE | MEMORY SIZE<br>APPLICATION MEMORY SIZE |
| SOUND DEVICE TYPE A | — |
| SOUND DEVICE TYPE B | — |

FIG. 8

APPLICATION-RESOURCE ATTRIBUTE INFORMATION 16

| TYPE OF APPLICATION | MEMORY RESOURCE | SOUND RESOURCE | COMMUNICATION RESOURCE |
|---|---|---|---|
| PHONE APPLICATION | 5 MB | USED EXCLUSIVELY | NOT USED |
| BROWSER APPLICATION | 25 MB | NOT USED | SHARED |
| MAIL APPLICATION | 30 MB | SHARED | SHARED |
| MEMORY PLAYER | 20 MB | SHARED | NOT USED |

FIG. 9

RESOURCE SHARING/EXCLUSING CONDITION 23

| RESOURCE TYPE | SHARING/EXCLUSING CONDITION |
|---|---|
| MEMORY DEVICE | SHARED<br>MEMORY SIZE > TOTAL MEMORY SIZE USED BY APPLICATIONS IN OPERATION |
| SOUND DEVICE TYPE A | USED EXCLUSIVELY |
| SOUND DEVICE TYPE B | SHARED |

F I G. 1 0
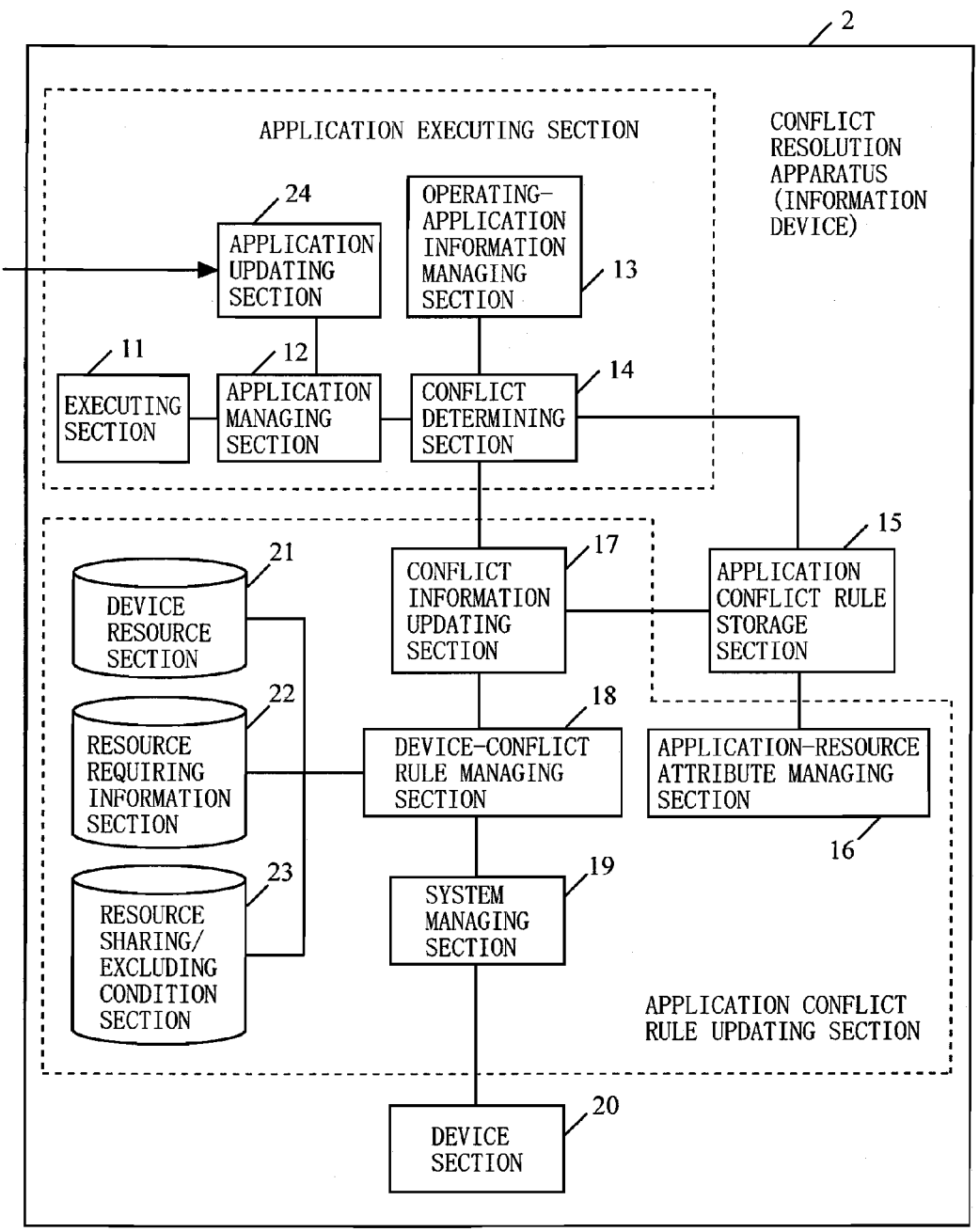

FIG. 11

APPLICATION-RESOURCE ATTRIBUTE INFORMATION 16

| TYPE OF APPLICATION | MEMORY RESOURCE | SOUND RESOURCE | COMMUNICATION RESOURCE |
|---|---|---|---|
| PHONE APPLICATION | 5 MB | USED EXCLUSIVELY | NOT USED |
| BROWSER APPLICATION | 35 MB | NOT USED | SHARED |
| MAIL APPLICATION | 30 MB | SHARED | SHARED |
| MEMORY PLAYER | 20 MB | SHARED | NOT USED |

FIG. 12

APPLICATION-RESOURCE ATTRIBUTE INFORMATION 16

| TYPE OF APPLICATION | MEMORY RESOURCE | SOUND RESOURCE | COMMUNICATION RESOURCE |
|---|---|---|---|
| PHONE APPLICATION | 5 MB | USED EXCLUSIVELY | NOT USED |
| BROWSER APPLICATION | 35 MB | NOT USED | SHARED |
| MAIL APPLICATION | 30 MB | SHARED | SHARED |
| MEMORY PLAYER | 20 MB | SHARED | NOT USED |
| RADIO APPLICATION | 5 MB | SHARED | NOT USED |

FIG. 13

| APPLICATION CONFLICT RULE | APPLICATION A | | | |
|---|---|---|---|---|
| APPLICATION B | BROWSER | PHONE APPLICATION | MELODY PLAYER | RADIO APPLICATION |
| BROWSER | ○ (NOT CONFLICTING) | △ (SUSPENDED) | ○ | ○ |
| PHONE APPLICATION | × (CONFLICTING) | × | ○ | × |
| MELODY PLAYER | × | × | × | ○ |
| RADIO APPLICATION | ○ | × | ○ | ○ |

CONFLICT RESOLUTION APPARATUS

BACKGROUND OF THE INVENTION

1. Technical Field

The present invention relates to a conflict resolution apparatus for resolving conflict among a plurality of applications, and more particularly, to a conflict resolution apparatus for automatically updating an application conflict rule specifying a conflict condition among the plurality of applications even in the case where a resource provided in the conflict resolution apparatus is changed.

2. Background Art

Conventionally, in an information device such as a mobile phone, a particular application (e.g., a function provided in a phone) is preferentially operated over another application (e.g., a melody player). For example, in the case where an incoming call is received by the mobile phone when melody is being reproduced by the melody player, reproducing of sounds stops, then an incoming call screen is displayed, and a ring tone starts ringing. This is because, in the case of the mobile phone, when the incoming call is received, the incoming call needs to be always given priority of a process and a conversation on the mobile phone needs to be always available. Further, the melody being reproduced at the time the incoming call is received interferes with a user having notification and/or a conversation. Thus, an interface for resolving such conflict among applications has been realized.

Further, in an information device in which applications such as a mobile phone, an audio visual device and a car navigation device are embedded before shipment, in order to resolve the conflict among the applications and provide a user with a further stabilized system, there has been a case where stability of the system is realized by calculating both an available memory size and a required memory size for the applications and by determining the maximum number of applications to be activated.

Further, operation tests have been thoroughly conducted on the applications embedded in such an information device before the shipment, and an application, which may cause the conflict among the applications, has not been initially embedded.

Patent document 1 discloses an information device, which refers to a conflict control table specifying a conflict condition among applications, determines whether or not to execute a new operation, and provides each of the applications with instructions on operation in order to resolve conflict among the applications.

(Patent Document 1) Japanese Laid-Open Patent Publication No. 2003-177926

However, for the information device disclosed in patent document 1, the conflict condition among the applications has been provided within the scope of the assumption before shipment, based on types of embedded applications and types of devices provided for the information device. Thus, it has been difficult to change the conflict condition after the shipment even in the case where changing the conflict condition among the applications is advantageous in terms of user convenience since a new device is added, for example.

Therefore, an object of the present invention is to resolve the above-described problem, i.e., to provide a conflict resolution apparatus capable of automatically updating an application conflict rule specifying the conflict condition among the applications even in the case where a resource provided for the system is changed by adding a device after the shipment.

SUMMARY OF THE INVENTION

The present invention is directed to a conflict resolution apparatus for resolving conflict among a plurality of applications. In order to attain the above-described object, the conflict resolution apparatus according to the present invention comprises an application conflict rule storage section for storing an application conflict rule specifying a conflict condition among the plurality of applications, an application executing section for determining the conflict among the plurality of applications in accordance with the application conflict rule and executing at least one application among the plurality of applications in accordance with a result of the determination, and an application conflict rule updating section for updating the application conflict rule, when a resource of the conflict resolution apparatus is changed, in accordance with a change of the conflict condition among the plurality of applications.

Preferably, the application executing section includes an executing section for executing the at least one application, a conflict determining section for determining the conflict among the plurality of applications in accordance with the application conflict rule, and an application managing section for managing execution of the at least one application in the executing section in accordance with a result of the determination made by the conflict determining section.

Preferably, the application conflict rule updating section includes: a system managing section for detecting a change of a state of a device provided in the conflict resolution apparatus; a device-conflict rule managing section for obtaining the resource of the conflict resolution apparatus after the state of the device has been changed in a case where the state of the device has been changed, and determining whether or not the conflict condition is to be changed in accordance with the obtained resource; and a conflict information updating section for updating, when the conflict condition is determined to be changed, the application conflict rule in accordance with the change of the conflict condition among the plurality of applications.

Further, the device-conflict rule managing section may obtain a resource required for operations of the plurality of applications in the case where the state of the device is changed, and may determine whether or not the conflict condition is to be changed in accordance with the obtained resource required for the operations of the plurality of applications and the resource of the conflict resolution apparatus, which resource of the conflict resolution apparatus is obtained after the state of the device has been changed.

Preferably, the application conflict rule updating section further includes a resource sharing/excluding condition section for storing a resource sharing/excluding condition which indicates a resource type of the device and a sharing/excluding condition among the plurality of applications. In this case, the device-conflict rule managing section further determines, in accordance with the resource sharing/excluding condition, whether or not the conflict condition is to be changed.

Preferably, the system managing section detects the change of the state of the device due to addition, replacement, or elimination of any of devices provided in the conflict resolution apparatus.

For example, a resource type of the device is a memory. In this case, the device-conflict rule managing section determines whether or not the conflict condition is to be changed, in accordance with a memory capacity of the conflict resolution apparatus in which the state of the device has been changed, and in accordance with a memory capacity required for operations of the plurality of applications.

For example, a resource type of the device is a sound board. In this case, the device-conflict rule managing section determines whether or not the conflict condition is to be changed, in accordance with a sound reproduction capability of the conflict resolution apparatus in which the state of the device has been changed, and in accordance with a sound reproduction capability required for operations of the plurality of applications.

Further, the present invention is directed to a conflict resolution method which is for resolving conflict among a plurality of applications and is implemented by an information device. The information device stores an application conflict rule specifying a conflict condition among the plurality of applications. In order to attain the above-described object, the conflict resolution method according to the present invention comprises detecting a change of a state of a device provided in the information device, obtaining a resource of the information device after the state of the device has been changed in a case where the state of the device has been changed, determining, in accordance with the obtained resource of the information device, whether or not the conflict condition among the plurality of applications is to be changed, and updating the application conflict rule when the conflict condition is determined to be changed.

Preferably, the conflict resolution method is provided in a form of a program for causing the information device to execute a series of procedures. The program may be stored in a computer-readable storage medium. Further, the conflict resolution method may be provided in a form of an integrated circuit contained in the information device.

According to the present invention, as described above, the application conflict rule specifying the conflict condition among the plurality of applications is automatically updated when the resource of the system is changed by adding, replacing or eliminating any of the devices. Therefore, in the case where the device is installed after the system is shipped, stable operation of the plurality of applications is ensured without having failure while performance of the device is fully utilized.

Further, a system designer does not need to design the conflict condition among the plurality of applications by anticipating, in advance, addition, replacement or elimination of any of the devices. Therefore, a load at the time of shipping the system is reduced. Still further, even in the case where a device needs to be added beyond the scope of the assumption, updating of the entire system is not necessary, and updating of only the application conflict rule addresses the case. Thus, the load at the time of adding the device is reduced.

Further, since it is possible to update the conflict condition, based on a state of the system, there is no necessity to retain the conflict condition for a device yet to be installed, for example. Therefore, an increase in a memory size, which is caused by retaining an unnecessary conflict condition, is prevented. Still further, the application conflict rule is updated so as to be the best for the system by dynamically determining a change of performance of devices, which change is caused by adding, replacing, or eliminating any of the devices. Thus, the load on a user is reduced.

BRIEF DESCRIPTION OF THE DRAWINGS

FIG. 3 is a diagram showing an exemplary application conflict rule stored in an application conflict rule storage section 15.

FIG. 4 is a diagram showing an exemplary application conflict rule specifying a conflict condition for a state of each application.

FIG. 6 is a diagram showing exemplary device-resource information which is set in a device resource section 21.

FIG. 7 is a diagram showing exemplary resource requiring information retained by a resource requiring information section 22.

FIG. 8 is a diagram showing exemplary application-resource attribute information managed by an application-resource attribute managing section 16.

FIG. 9 is a diagram showing an exemplary resource sharing/excluding condition retained by a resource sharing/excluding condition section 23.

FIG. 10 is a block diagram showing an exemplary configuration of a conflict resolution apparatus 2 according to a second embodiment of the present invention.

FIG. 11 is a diagram showing exemplary application-resource attribute information managed by the application-resource attribute managing section 16.

FIG. 12 is a diagram showing exemplary application-resource attribute information managed by the application-resource attribute managing section 16.

FIG. 13 is a diagram showing an exemplary application conflict rule stored in the application conflict rule storage section 15.

Figure 1:
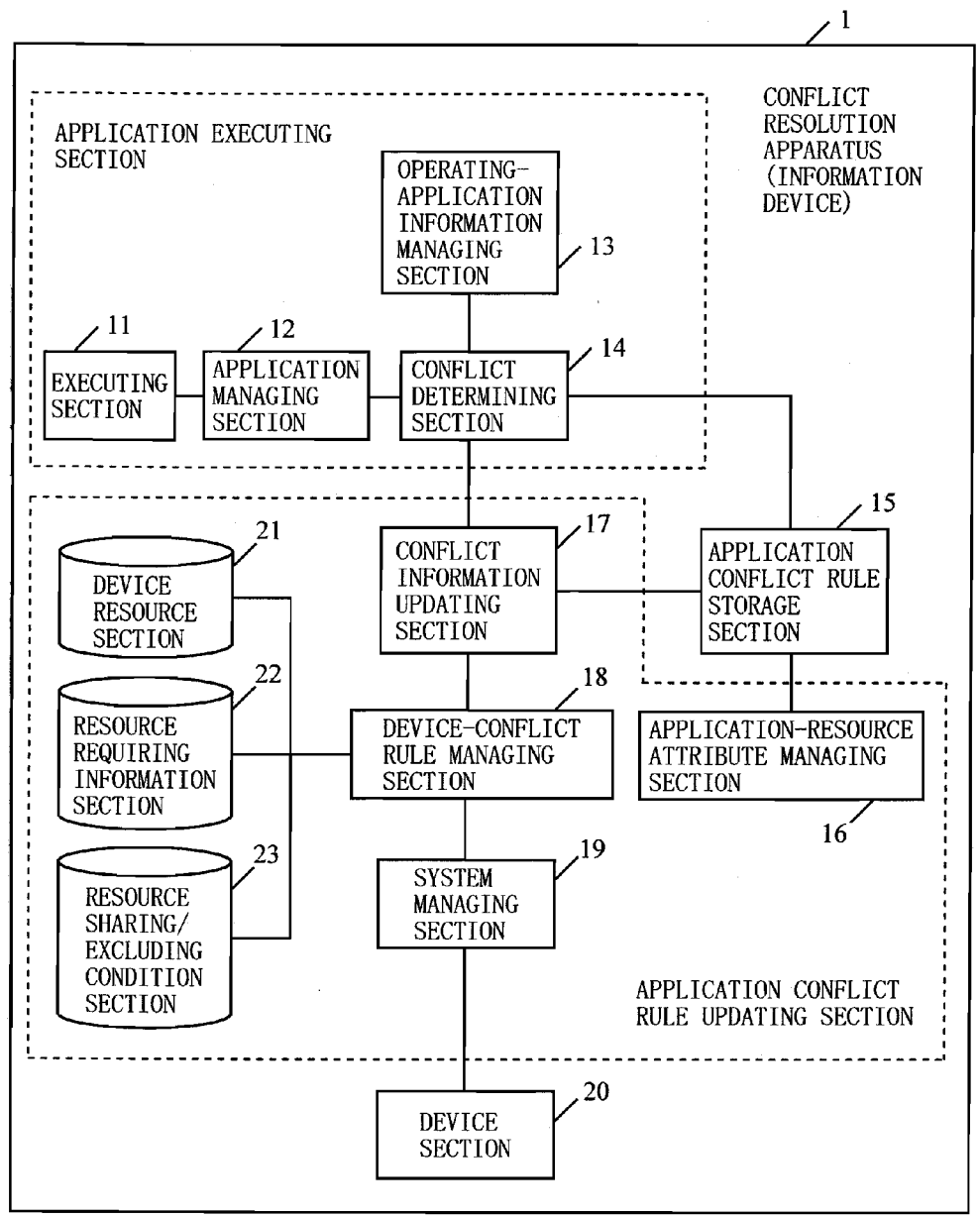
FIG. 1 is a block diagram showing an exemplary configuration of a conflict resolution apparatus 1 according to a first embodiment of the present invention.

DESCRIPTION OF THE REFERENCE CHARACTERS 11 executing section
12 application managing section
13 operating-application information managing section
14 conflict determining section
15 application conflict rule
16 application-resource attribute managing section
17 conflict information updating section
18 device-conflict rule managing section
19 system managing section
20 device section
21 device resource section
22 resource requiring information section
23 resource sharing/excluding condition section
24 application updating section

DETAILED DESCRIPTION OF THE INVENTION

Hereinafter, embodiments of the present invention will be described with reference to the drawings.

First Embodiment

FIG. 1 is a block diagram showing an exemplary configuration of a conflict resolution apparatus 1 according to a first embodiment of the present invention. As shown in FIG. 1, the conflict resolution apparatus (information device) 1 comprises an executing section 11, an application managing section 12, an operating-application information managing section 13, a conflict determining section 14, an application conflict rule storage section 15, an application-resource attribute managing section 16, a conflict information updating section 17, a device-conflict rule managing section 18, a system managing section 19, a device section 20, a device resource section 21, a resource requiring information section 22, and a resource sharing/excluding condition section 23.

The executing section 11 executes an application stored in the application managing section 12. Here, the application is, for example, a phone application or a browser application if the conflict resolution apparatus 1 is a mobile phone. The application managing section 12 stores the application executed by the executing section 11 and also manages an operation of the application executed by the executing section 11. The operating-application information managing section 13 manages information of the application in operation. The conflict determining section 14 determines conflict among applications in accordance with an application conflict rule.

The application conflict rule storage section 15 stores the application conflict rule specifying a conflict rule among the applications (see FIGS. 3 and 4). The application-resource attribute managing section 16 manages, as application-resource attribute information, resource information required for each application (see FIG. 8). The conflict information updating section 17 updates the application conflict rule when a conflict condition among the applications is changed. The device-conflict rule managing section 18 identifies a type of information required for determining the conflict condition when a state of a device is changed.

The system managing section 19 manages a state of the device section 20. A function of the system managing section 19 is realized by an OS such as Linux (registered trademark). The device section 20 represents devices provided in the conflict resolution apparatus 1. The device section 20 includes, for example, a memory, a device for reproducing a sound, a device for performing communication, and the like. The device resource section 21 retains, as device-resource information, information such as a resource type corresponding to each device (see FIG. 6). The resource requiring information section 22 retains, as resource requiring information, a type of information required for determining the conflict rule for the resource type (see FIG. 7). The resource sharing/excluding condition section 23 stores the resource type and a sharing/excluding condition among the applications as a resource sharing/excluding condition (see FIG. 9).

The executing section 11, the application managing section 12, the operating-application information managing section 13 and the conflict determining section 14 determine the conflict among a plurality of applications in accordance with the application conflict rule and execute at least one application in accordance with a result of the determination, thereby being collectively represented as an application executing section. Similarly, when a resource of the conflict resolution apparatus 1 is changed, the application-resource attribute managing section 16, the conflict information updating section 17, the device-conflict rule managing section 18, the system managing section 19, the device resource section 21, the resource requiring information section 22 and the resource sharing/excluding condition section 23 update the application conflict rule in accordance with a change of the conflict condition among the plurality of applications, thereby being collectively represented as an application conflict rule updating section.

Figure 2:
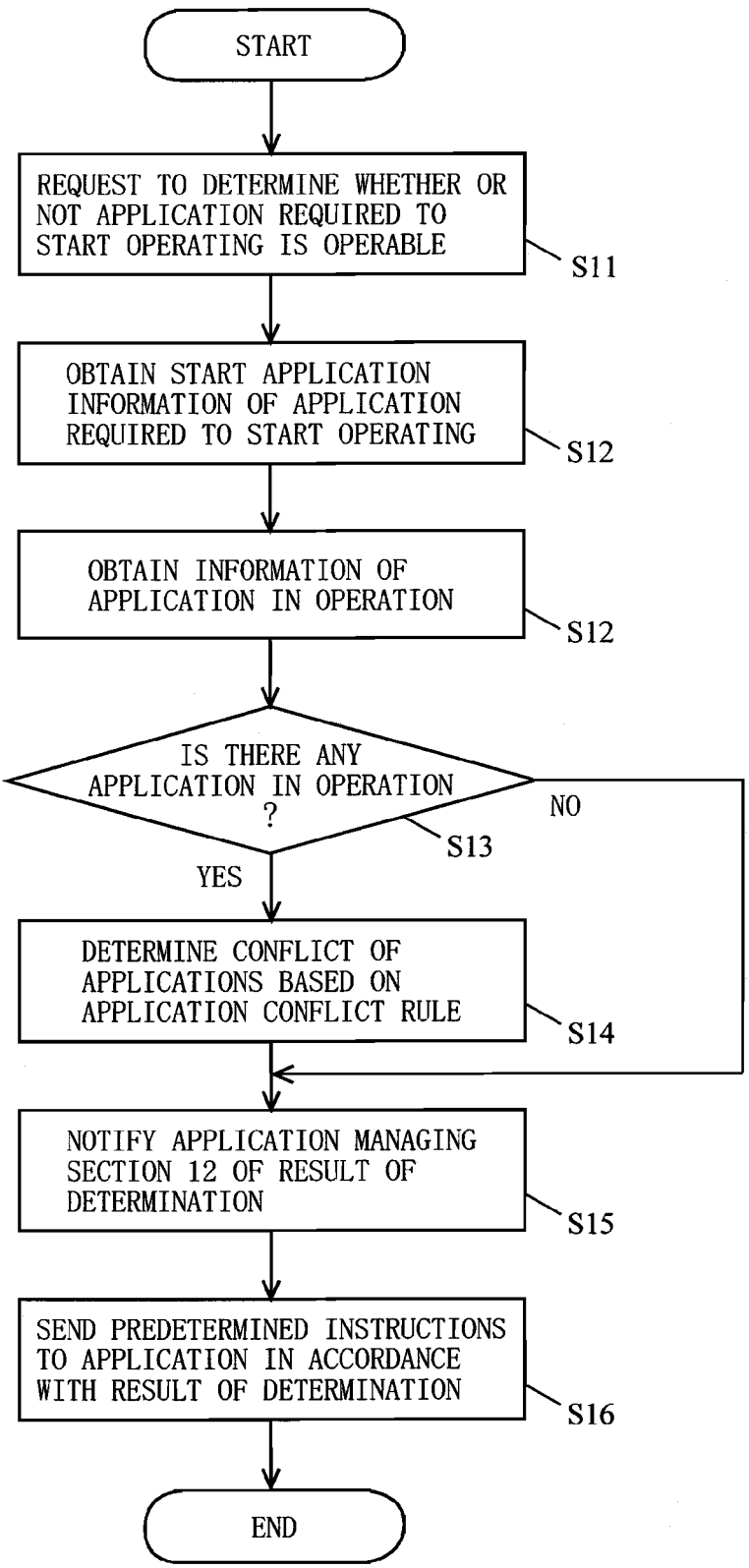
FIG. 2 is a flow chart showing an exemplary operation of a conflict resolution method implemented by the conflict resolution apparatus 1 according to the first embodiment of the present invention.

FIG. 2 is a flow chart showing an exemplary operation of a conflict resolution method which is implemented by the conflict resolution apparatus 1 according to the first embodiment of the present invention. Here, assume that application A having a low priority is already operating, as a premise for the following description of the flow chart. A scenario described for the flow chart is that application B having priority over application A is required to operate and then application A stops operating.

As described in FIG. 2, triggered by a user operation or the like, the conflict resolution apparatus 1 requests that an operation of application B, which has priority over application A in operation, be started. Specifically, triggered by the user operation or the like, the executing section 11 requests the application managing section 12 to start the operation of application B. After requested to start the operation of application B by the executing section 11, the application managing section 12 requests the conflict determining section 14 to determine whether or not application B is operable (step S11).

The conflict determining section 14 obtains start application information of the application which has been requested to start operating by the application managing section 12 (step S12). The start application information is information for identifying the application requested to start operating and is exemplified by a unique ID set for each application. Here, the conflict determining section 14 obtains the start application information of application B from the application managing section 12.

Next, if there is an application in operation, the conflict determining section 14 inquires, of the operating-application information managing section 13, information about the application in operation, in order to resolve the conflict among the applications. The operating-application information managing section 13 responds to the conflict determining section 14 with respect to the inquiry, if there is the information about the application in operation. Here, the operating-application information managing section 13 sends back the information about application A. The conflict determining section 14 determines, based on the information sent back from the operating-application information managing section 13, whether or not there is an application in operation (step S13).

When determined that there is no application in operation, the conflict determining section 14 causes a status to proceed to step S15. On the other hand, when the conflict determining section 14 has determined that there is the application in operation, the conflict determining section 14 further determines, based on the application conflict rule, whether or not application A in operation conflicts with application B requested to operate (step S14).

FIG. 3 is a diagram showing an exemplary application conflict rule stored in the application conflict rule storage section 15. As shown in FIG. 3, the application conflict rule specifies the conflict condition between application A in operation and application B requested to operate. For example, assume that application A in operation is a browser and application B requested to operate is a phone application. In this case, the conflict determining section 14 refers to the application conflict rule and determines that the browser conflicts with the phone application. When application A and application B conflict with each other, the conflict determining section 14 then determines which of the applications is higher in priority. For example, when a priority level is set for each of the applications, the conflict determining section 14 determines the priority between the applications in accordance with the priority level set for each of the applications.

The conflict determining section 14 notifies the application managing section 12 of the result of the determination of the conflict. Further, the conflict determining section 14 updates the information of the application in operation, which information is managed by the operating-application information managing section 13 (step S15). The application managing section 12 sends predetermined instructions to application A and application B, based on the result of the determination by the conflict determining section 14 (step S16). Here, the application managing section 12 gives a command to stop the operation of application A and to start the operation of application B since application B has priority over application A.

Although the conflict condition is specified for the respective applications in the above-described application conflict rule (see FIG. 3), the conflict condition may be specified for respective states of the applications. FIG. 4 is a diagram showing an exemplary application conflict rule specifying the conflict condition for each state of the applications. In this case, the conflict resolution apparatus 1 is capable of determining the conflict among the applications in accordance with each state of the applications.

For example, the conflict determining section 14 determines the conflict between the applications, based on whether or not application B can be activated while reproducing sounds, when application A is reproducing sounds. Alternatively, the conflict determining section 14 determines the conflict between the applications, based on whether or not a memory size, which is obtained by adding a memory size of application A in a certain state to a memory size required for application B in a certain state, is larger than the total memory size provided by a system.

A more specific operation of the conflict resolution apparatus 1 will be described assuming that application A in operation is a TV application, and application B requested to operate is a phone application. Hereinafter, described is a case where the phone application is requested to allow a phone conversation (for example, state 2) when the TV application is reproducing sounds (for example, state 1). In this case, the conflict determining section 14 determines, by referring to the application conflict rule shown in FIG. 4, that state 1 of the TV application and state 2 of the phone application conflict with each other. The conflict determining section 14 then determines, based on the priority level set for each of the applications, that the phone application has priority over the TV application. The application managing section 12 causes the TV application to stop operating and causes the phone application to start operating in accordance with the result of the determination by the conflict determining section 14.

Figure 5:
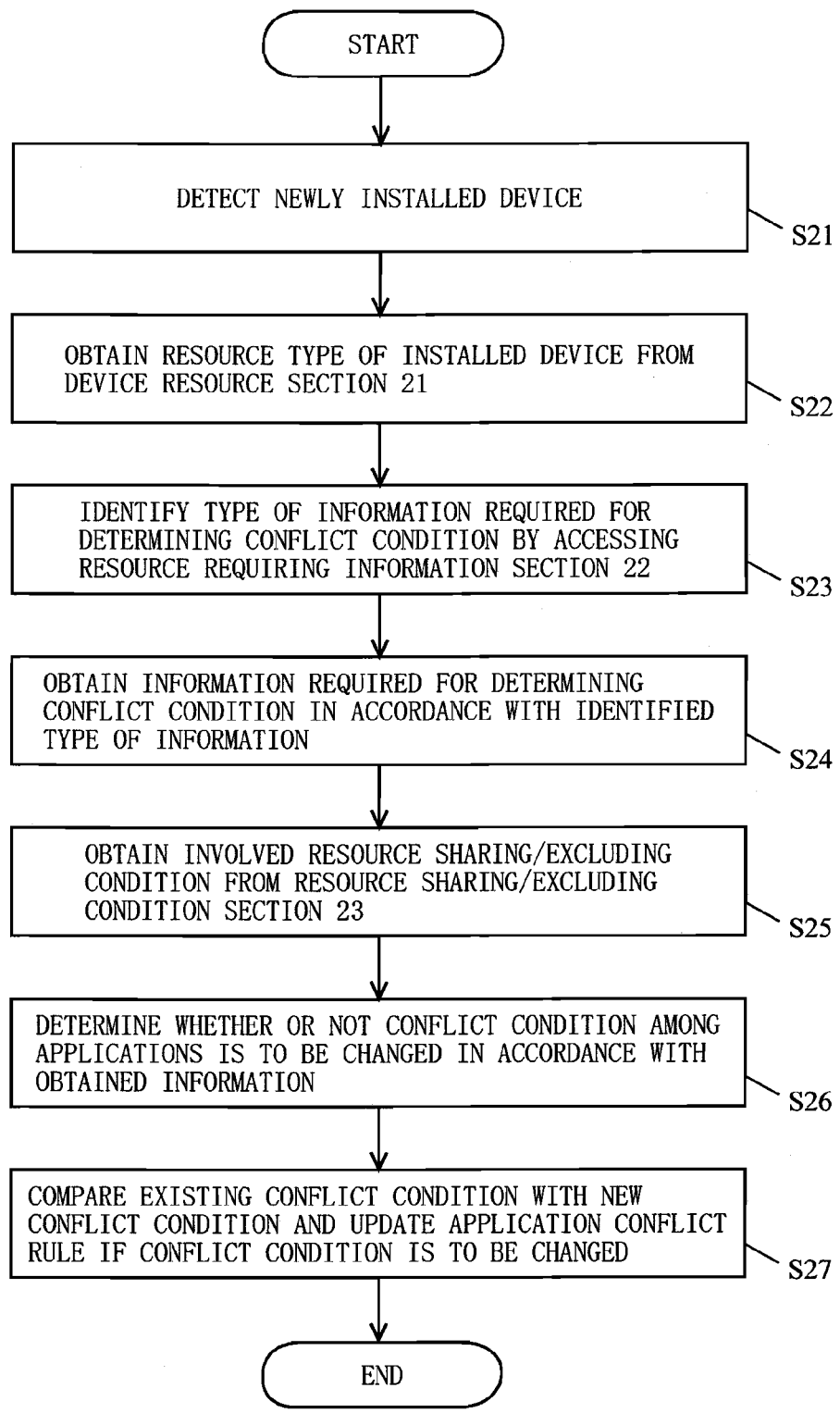
FIG. 5 is a flow chart showing an exemplary method for updating the application conflict rule, the method being implemented by the conflict resolution apparatus 1 according to the first embodiment of the present invention.

Next, a method for updating the application conflict rule will be described in the case where the conflict condition is changed due to a change of a state of any of the devices of the conflict resolution apparatus 1 after a new device is installed therein. Here, a term 'to install' includes concepts of addition, replacement and elimination of a device. FIG. 5 is a flow chart showing an exemplary method for updating the application conflict rule and the method is implemented by the conflict resolution apparatus 1 according to the first embodiment of the present invention. Hereinafter, specifically described is a case where a user has installed a new memory card as a device of the conflict resolution apparatus 1.

As shown in FIG. 5, when the device has been installed in the conflict resolution apparatus 1, the system managing section 19 detects the newly installed device (step S21). After detecting the newly installed device, the system managing section 19 notifies the device-conflict rule managing section 18 of the newly installed device together with a device ID for identifying the device, or the like. At the same time, the system managing section 19 also configures various settings such that the new device is available for use.

The device-conflict rule managing section 18 obtains, from the device resource section 21, the resource type corresponding to the device ID in order to determine the resource to which the installed device corresponds (step S22). FIG. 6 is a diagram showing exemplary device-resource information which is set in the device resource section 21. As shown in FIG. 6, the device resource section 21 retains, as the device-resource information, the resource type corresponding to the device ID. Here, for example, when a device ID 'sd3893DA' is obtained from the system managing section 19, the device-conflict rule managing section 18 recognizes, by accessing the device-resource managing section 21, the device as the memory device.

Next, by accessing the resource requiring information section 22, the device-conflict rule managing section 18 identifies the type of information required for determining the conflict condition, based on the resource type obtained from the device resource section 21 (step S23). FIG. 7 is a diagram showing an exemplary resource requiring information retained by the resource requiring information section 22. As shown in FIG. 7, the resource requiring information section 22 retains, for each resource type, as the resource requiring information, the type of information required for determining the conflict condition. Here, since the installed device is the memory device, the device-conflict rule managing section 18 identifies a memory size and an application memory size as the information required for determining the conflict condition.

The device-conflict rule managing section 18 obtains the information required for determining the conflict condition in accordance with the identified type of the information (step S24). The device-conflict rule managing section 18, for example, accesses the system managing section 19 to obtain the memory size of the entire system, and accesses the application-resource attribute managing section 16 to obtain the memory size required for causing each application to operate. FIG. 8 is a diagram showing exemplary application-resource attribute information managed by the application-resource attribute managing section 16. As shown in FIG. 8, the application-resource attribute managing section 16 manages, as the application-resource attribute information, the resource information required for each application.

Next, the device-conflict rule managing section 18 obtains a sharing/excluding condition of an involved resource from the resource sharing/excluding condition section 23 (step S25). FIG. 9 is a diagram showing an exemplary resource sharing/excluding condition retained by the resource sharing/excluding condition section 23. As shown in FIG. 9, the resource sharing/excluding condition section 23 retains, as the resource sharing/excluding condition, the resource type and the sharing/excluding condition among the applications. Here, since the installed device is the memory device, the device-conflict rule managing section 18 obtains the sharing/excluding condition indicating that the installed device is shared by the applications. This sharing/excluding condition specifies that the memory size of the device is larger than the total memory size of the applications in operation.

Next, the device-conflict rule managing section 18 determines, based on the information obtained so far (in this case, the memory size of the installed device, the memory size initially provided, the memory size to be used by each of the applications, the sharing/excluding condition of the memory device, etc.), whether or not the conflict condition among the applications is changed (step S26). Specifically, the device-conflict rule managing section 18 determines, based on the obtained information, a condition for an application to be operable in the circumstances where the applications are each operating, and notifies the conflict information updating section 17 of the determined condition. For example, in the case where four applications shown in FIG. 8 are operable simultaneously, the total memory size of all the applications to operate simultaneously is 80 MB. Therefore, when the total memory size provided for the system is 128 MB, there is no problem with the memory size even when all the applications operate simultaneously. In this case, a new conflict condition for the memory size is created.

The conflict information updating section 17 compares an existing conflict condition with a new conflict condition and updates the application conflict rule when the conflict condition is changed (step S27). For example, when a memory card size previously installed is 30 MB, a mail application is not operable while another application is operating, due to a limitation of the memory size. If, however, the memory size is increased by updating the device, such conflict over the memory size is resolved. Therefore, the conflict information updating section 17 updates the application conflict rule such that applications not having any limitations other than the condition for the memory size are activated simultaneously with the mail application.

Further, the conflict resolution apparatus 1 is capable of updating the application conflict rule when a new sound board is installed therein. For example, assume that due to a performance (capacity for reproducing a sound) problem, the conflict resolution apparatus 1 is merely capable of reproducing a sound which is outputted from a single application. In this case, in the conflict resolution apparatus 1, the performance problem is resolved by installing the new sound board therein, and accordingly a plurality of applications to output a sound are allowed to operate simultaneously. Thus, when the new sound board is installed, the conflict resolution apparatus 1 updates the application conflict rule in the same manner as in the case of the memory device since the conflict condition among the applications is changed.

Still further, the conflict resolution apparatus 1 is capable of updating the application conflict rule when a new video board is installed therein. For example, assume that due to a performance problem, the conflict resolution apparatus 1 is merely capable of reproducing a video which is outputted from a single application. In this case, in the conflict resolution apparatus 1, the performance problem is resolved by installing the new video board therein, and accordingly a plurality of applications to output a video are allowed to operate simultaneously. Thus, when the new video is installed, the conflict resolution apparatus 1 updates the application conflict rule in the same manner as in the case of the memory device since the conflict condition among the applications is changed.

Still further, the conflict resolution apparatus 1 is capable of updating the application conflict rule when a new camera is installed therein. For example, assume that the conflict resolution apparatus 1 is merely capable of capturing a video by using a single application since only one camera is provided thereto. In this case, the conflict resolution apparatus 1 has two cameras by installing the new camera therein, and accordingly a plurality of applications to capture a video are allowed to operate simultaneously. Thus, when the new camera is installed, the conflict resolution apparatus 1 updates the application conflict rule in the same manner as in the case of the memory device since the conflict condition among the applications is changed.

As described above, in the conflict resolution apparatus 1 according to the first embodiment of the present invention, when the resource provided in the system is changed by adding, replacing, or eliminating any of the devices, the application conflict rule specifying the conflict condition among the applications is automatically updated. Thus, even in the case where a device is installed in the system after the shipment thereof, stable operations of the applications are ensured without having failures, while performance of the device is fully utilized.

Further, a system designer does not need to design the conflict condition among the applications by anticipating, in advance, addition, replacement, or elimination of a device. Therefore, the load at the time of shipping the system is reduced. Still further, even in the case where a device needs to be added beyond the scope of the assumption, updating of the entire system is not necessary, and updating of only the application conflict rule addresses the case. Thus, the load at the time of adding the device is reduced.

Still further, since it is possible to update the conflict condition, based on the state of the system, there is no necessity to retain the conflict condition for a device yet to be installed, for example. Therefore, an increase in the memory size, which is caused by retaining an unnecessary conflict condition, is prevented. Still further, the application conflict rule is updated to the optimal application conflict rule by dynamically determining a change of performance of the devices, which change is caused by adding, replacing, or eliminating any of the devices. Thus, the load on a user is reduced.

In the description above, it is assumed that the executing section 11 executes an application stored in the application managing section 12. However, instead of executing the application, the executing section 11 may merely execute software such as middleware having received a request from the application.

In the description above (FIG. 2), only a sequence in the case of starting an operation of an application is described. However, when the application stops operating, the conflict determining section 14 may determine the conflict among the applications and update the operating-application information managing section 13.

In the description above, the conflict determining section 14 determines the conflict in accordance with relationships among the applications. However, the conflict determining section 14 may determine the conflict by group classified based on a type of each application. Alternatively, the conflict determining section 14 may determine the conflict based on the resource type to be used by each application or based on other attributes.

In the description above, the conflict determining section 14 determines which of the applications has priority over the other based on the priority level set for each of the applications when the applications conflict with each other. However, the conflict determining section 14 may determine priority in accordance with information such as the number of resources used by each of the applications and execution time of each of the applications. This enables the conflict resolution apparatus 1 to prevent a few applications from using some resources for long periods of time or using a number of resources.

In the aforementioned application conflict rule (see FIG. 3), merely "conflicting", "not conflicting", and "suspended" are described as the conflict condition between application A in operation and application B requested to operate. However, an additional priority level may be applied to the applications. Accordingly, the conflict resolution apparatus 1 is allowed to determine the priority between the applications in accordance with the application conflict rule. The conflict resolution apparatus 1 may perform a predetermined operation in the case where the conflicting applications have the same priority level.

When the result of the determination is "suspended", the application managing section 12 discontinues the operation of application B. However, after application A stops operating, the discontinued operation of application B may be restarted. Further, in this case where a plurality of the applications are suspended, the application managing section 12 may select an application having the highest priority from among the plurality of the applications and may restart the operation of the selected application. Consequently, the conflict resolution apparatus 1 realizes the operation which is of great convenience to users.

In the description above, the device-conflict rule managing section 18 accesses the device resource section 21, the resource requiring information section 22, the resource sharing/excluding condition section 23, and the application-resource attribute managing section 16 in order to obtain the information required for determining the conflict condition. However, the device-conflict rule managing section 18 may access an external server or the like and obtain the information required for determining the conflict condition. As means to access the server in this case, any means, e.g., cable communication, IrDA radio communication, or the like, may be used.

Further, the information, which is obtained from the external server and is required for determining the conflict condition, may be encrypted. In this case, the device-conflict rule managing section 18 attempts to decrypt the encrypted information, and only when the decrypting is successful, the device-conflict rule managing section 18 may change the conflict condition and install the device, placing reliance upon the obtained information. When the decrypting ends in failure, the conflict condition does not need to be changed, but the device may be installed.

Further, in the description above, it is assumed that the information of the device to be newly installed is obtainable. However, in the case where the information is not obtainable, a default attribute value may be previously determined and considered as an obtained value.

Further, in the conflict resolution apparatus, functional blocks such as the application managing section 12, the operating-application information managing section 13, the conflict determining section 14, the conflict information updating section 17, the device-conflict rule managing section 18 and the system managing section 19 may be operated as a program. This program may be operated by one CPU, or may be operated by a plurality of CPUs by dividing processes of the functional blocks.

Further, the functional blocks such as the application conflict rule storage section 15, the application-resource attribute managing section 16, the device resource section 21, the resource requiring information section 22 and the resource sharing/excluding condition section 23 may be data stored in a ROM or a RAM. Alternatively, these functional blocks may be data stored in a memory of an embedded device or may be data stored in a removal external memory.

Further, the functional blocks such as the application managing section 12, the operating-application information managing section 13, the conflict determining section 14, the conflict information updating section 17, the device-conflict rule managing section 18 and the system managing section 19 are typically realized as an LSI, which is an integrated circuit. These may be separately constructed in a chip form, or all or some of the functional blocks may be constructed in the chip form. Here, although the LSI is cited as an example, the integrated circuit may be referred to as an IC, a system LSI, a super LSI, or an ultra LSI, depending on the degree of integration. Also, the method of integration is not limited to the LSI, and may be realized by a dedicated circuit or a general purpose processor. An FPGA (Field Programmable Gate Array), which can be programmed after manufacturing the LSI, or a re-configurable processor enabling connections and settings of circuit cells in the LSI to be reconfigured may be used. Further, in the case where another integration technology replacing the LSI becomes available due to improvement of a semiconductor technology or due to emergence of another technology derived therefrom, the integration of the functional blocks may be performed using such a technology. For example, biotechnology may be applied to the above-described integration.

Second Embodiment

FIG. 10 is a block diagram showing an exemplary configuration of a conflict resolution apparatus 2 according to a second embodiment of the present invention. As shown in FIG. 10, the conflict resolution apparatus 2 further comprises an application updating section 24 as compared with the conflict resolution apparatus 1 according to the first embodiment. The application updating section 24 downloads an application from the outside by using some sort of communication means and updates another application stored in the application managing section 12. The application updating section 24 may update the application stored in the application managing section 12 by using a medium such as a memory card having an application stored therein, other than using the communication means.

The application managing section 12 updates various types of information contained in the conflict resolution apparatus 2 in accordance with the updated application. For example, the application managing section 12 updates, based on information retained by the updated application, the application conflict rule stored in the application conflict rule storage section 15 and the application-resource attribute information managed by the application-resource attribute managing section 16. In the case where the conflict condition among the applications and the resource information to be used are set for the updated application, the application managing section 12 updates, based on the set information, information contained in the application conflict rule storage section 15 and the application-resource attribute managing section 16. In the case where the conflict condition among the applications and the resource information to be used are not set for the updated application, the application managing section 12 deduces, based on the type of the updated application and the like, the conflict condition among the applications and the resource information to be used and then updates, based on the deduced information, the information contained in the application conflict rule storage section 15 and the application-resource attribute managing section 16.

For example, assume that the application updating section 24 has upgraded a version of the browser application stored in the application managing section 12 in accordance with user instructions. The application managing section 12 determines whether or not the resource required for the browser application is changed. Here, assume that the memory size required for the browser application has increased from 25 MB to 35 MB. After recognizing that the memory size required for the browser application has increased from 25 MB to 35 MB, the application managing section 12 updates the application-resource attribute information such that a setting value of a memory resource of the browser application is 35 MB (see FIG. 11).

For example, assume that the application updating section 24 has downloaded a radio application and stored the radio application in the application managing section 12 in accordance with user instructions. The application managing section 12 obtains the resource information required for the radio application. Here, assume that the memory size required for the radio application is 5 MB, a sound resource is a shared resource, and a communication resource is unused. After obtaining the resource information required for the radio application, the application managing section 12 adds the resource information of the radio application to the application-resource attribute information (see FIG. 12). The application managing section 12 identifies an application which may possibly conflict with the radio application. Here, assume that the application conflicting with the radio application is only a phone application. After recognizing that the application conflicting with the radio application is the phone application, the application managing section 12 sets, in the application conflict rule, the conflict condition for the radio application (see FIG. 13).

Therefore, the conflict resolution apparatus 2 is able to resolve the conflict among the applications even in the case where a state of an application is changed.

The conflict resolution apparatus according to the present invention is applicable to a mobile device such as a mobile phone, a PDA, and a car navigation device, and also an embedded device such as an audio visual device.

The invention claimed is:

1. A conflict resolution apparatus for resolving conflicts among a plurality of applications, comprising:
an application conflict rule storage section configured to store an application conflict rule specifying a conflict condition among the plurality of applications;
an application executing section configured to determine the conflict condition among the plurality of applications in accordance with the application conflict rule and configured to execute at least one application among the plurality of applications in accordance with a result of the determination of the conflict condition; and
an application conflict rule updating section configured to update the application conflict rule, when a resource of the conflict resolution apparatus is changed, in accordance with a change of the conflict condition among the plurality of applications, wherein
the application conflict rule updating section includes:
a system managing section configured to detect a change of a state of a device provided in the conflict resolution apparatus;
a device-conflict rule managing section configured to obtain the resource of the conflict resolution apparatus after the state of the device has been changed, and configured to determine whether or not the conflict condition that has been specified by the application conflict rule stored in the application conflict rule storage section is to be changed in accordance with the obtained resource; and
a conflict information updating section configured to update, when the conflict condition is determined to be changed, the application conflict rule stored in the application conflict rule storage section to create a new application conflict rule specifying a new conflict condition in accordance with the change of the conflict condition among the plurality of applications,
wherein a resource type of the device is a memory, and
the device-conflict rule managing section configured to determine whether or not the conflict condition is to be changed, in accordance with a memory capacity of the conflict resolution apparatus in which the state of the device has been changed, and in accordance with the memory capacity required for operations of the plurality of applications.

2. The conflict resolution apparatus according to claim 1, wherein
the application executing section includes:
an executing section configured to execute the at least one application;
a conflict determining section configured to determine the conflict condition among the plurality of applications in accordance with the application conflict rule; and
an application managing section configured to manage execution of the at least one application in the executing section in accordance with a result of the determination made by the conflict determining section.

3. The conflict resolution apparatus according to claim 1, wherein
the device-conflict rule managing section configured to obtain a resource required for operations of the plurality of applications in a case where the state of the device has been changed, and
configured to determine whether or not the conflict condition is to be changed in accordance with the obtained resource required for the operations of the plurality of applications and the resource of the conflict resolution apparatus, which resource of the conflict resolution apparatus is obtained after the state of the device has been changed.

4. The conflict resolution apparatus according to claim 1, wherein
the application conflict rule updating section further includes a resource sharing or excluding condition section configured to store a resource sharing or excluding condition which indicates the resource type of the device and a sharing or excluding condition among the plurality of applications, and
the device-conflict rule managing section further configured to determine, in accordance with the resource sharing or excluding condition, whether or not the conflict condition is to be changed.

5. The conflict resolution apparatus according to claim 1, wherein the system managing section configured to detect the change of the state of the device due to addition, replacement, or elimination of any device provided in the conflict resolution apparatus.

6. The conflict resolution apparatus according to claim 1, wherein
the resource type of the device is a sound board, and
the device-conflict rule managing section configured to determine whether or not the conflict condition is to be changed, in accordance with a sound reproduction capability of the conflict resolution apparatus in which the state of the device has been changed, and in accordance with a sound reproduction capability required for operations of the plurality of applications.

7. A conflict resolution method for resolving conflicts among a plurality of applications and implemented by an information device, wherein the information device stores an application conflict rule specifying a conflict condition among the plurality of applications, the conflict resolution method comprising:
determining the conflict condition among the plurality of applications in accordance with the application conflict rule and executing at least one application among the plurality of applications in accordance with a result of the determination of the conflict condition;

updating the application conflict rule, when a resource of the information device is changed, in accordance with a change of the conflict condition among the plurality of applications, the updating of the application conflict rule including:

detecting a change of a state of a device provided in the information device;

obtaining a resource of the information device after the state of the device has been changed in a case where the state of the device has been changed;

determining, in accordance with the obtained resource of the information device, whether or not the conflict condition among the plurality of applications that has been specified by the application conflict rule stored in the information device is to be changed; and updating, when the conflict condition is determined to be changed, the application conflict rule stored in the information device to create a new application conflict rule specifying a new conflict condition in accordance with the change of the conflict rule among the plurality of applications, wherein a resource type of the device is a memory, and it is determined whether or not the conflict condition is to be changed, in accordance with a memory capacity of the information device in which the state of the device has been changed, and in accordance with the memory capacity required for operations of the plurality of applications.

8. A non-transitory computer-readable recording medium storing a program for resolving conflicts among a plurality of applications and executed by an information device, wherein the information device stores an application conflict rule specifying a conflict condition among the plurality of applications, the program causing a computer to execute the steps comprising:

determining the conflict condition among the plurality of applications in accordance with the application conflict rule and executing at least one application among the plurality of applications in accordance with a result of the determination of the conflict condition;

updating the application conflict rule, when a resource of the information device is changed, in accordance with a change of the conflict condition among the plurality of applications, the updating of the application conflict rule including;

detecting a change of a state of a device provided in the information device;

obtaining a resource of the information device after the state of the device has been changed in a case where the state of the device has been changed;

determining, in accordance with the obtained resource of the information device, whether or not the conflict condition among the plurality of applications is to be changed; and updating, when the conflict condition is determined to be changed, the application conflict rule stored in the information device to create a new application conflict rule specifying a new conflict condition in accordance with the change of the conflict rule among the plurality of applications, wherein a resource type of the device is a memory, and it is determined whether or not the conflict condition is to be changed, in accordance with a memory capacity of the information device in which the state of the device has been changed, and in accordance with the memory capacity required for operations of the plurality of applications.

9. An integrated circuit for resolving conflicts among a plurality of applications and provided in an information device, wherein the information device stores an application conflict rule specifying a conflict condition among the plurality of applications, the integrated circuit comprising:

an application executing section configured to determine the conflict condition among the plurality of applications in accordance with the application conflict rule and executes at least one application among the plurality of applications in accordance with a result of the determination of the conflict condition; and an application conflict rule updating section configured to update the application conflict rule, when a resource of the information device is changed, in accordance with a change of the conflict condition among the plurality of applications, wherein;

a detecting section configured to detect a change of a state of a device provided in the information device;

an obtaining section configured to obtain a resource of the information device after the state of the device has been changed in a case where the state of the device has been changed;

a determining section configured to determine, in accordance with the obtained resource of the information device, whether or not the conflict condition among the plurality of applications that has been specified by the application conflict rule stored in the information device is to be changed; and an updating section configured to update, when the conflict condition is determined to be changed, the application conflict rule stored in the information device to create a new application conflict rule specifying a new conflict condition in accordance with the change of the conflict condition among the plurality of the applications, wherein a resource type of the device is a memory, and the determining section configured to determine whether or not the conflict condition is to be changed, in accordance with a memory capacity of the obtaining section in which the state of the device has been changed, and in accordance with the memory capacity required for operations of the plurality of applications.

* * * * *